United States Patent [19]

Sanders

[11] Patent Number: 5,215,609
[45] Date of Patent: Jun. 1, 1993

[54] CONTINUOUS PROCESS FOR PRODUCING ULTRASONICALLY WELDED AIR FILTERS

[76] Inventor: Scott L. Sanders, 911 Brian Dr., Crest Hill, Ill.

[21] Appl. No.: 811,832

[22] Filed: Dec. 20, 1991

[51] Int. Cl.⁵ .................. B32B 31/16; B01D 46/02
[52] U.S. Cl. .................... 156/70; 156/73.1; 156/73.4; 156/166; 156/176; 156/250; 156/269; 156/290; 156/292; 156/324; 264/23; 53/409; 53/450; 55/379; 55/382; 55/486; 55/487; 55/DIG. 5
[58] Field of Search .............. 156/73.1, 73.4, 166, 156/176, 250, 269, 324, 70, 290, 292; 264/23; 53/204, 409, 450; 55/379, 382, 486, 487, DIG. 5

[56] References Cited

U.S. PATENT DOCUMENTS

| | | | |
|---|---|---|---|
| 3,727,769 | 4/1973 | Scholl | 53/450 X |
| 4,080,185 | 3/1978 | Richter et al. | 55/379 |
| 4,150,959 | 4/1979 | Bielak | 55/379 X |
| 4,356,011 | 10/1982 | Day et al. | 55/382 X |
| 4,449,993 | 5/1984 | Bergeron | 55/379 |

Primary Examiner—David A. Simmons
Assistant Examiner—J. Sells
Attorney, Agent, or Firm—Stuart I. Graff

[57] ABSTRACT

A method for continuously producing air filters made from synthetic materials is described, wherein an essentially continuous length of filter material is passed through a series of ultrasonic welding means to form a pocket into which a frame can be inserted. The pocket is then ultrasonically welded closed. Individual filters are then cut from the length of filter material. The process may also be used to create synthetic bag filters.

20 Claims, 3 Drawing Sheets

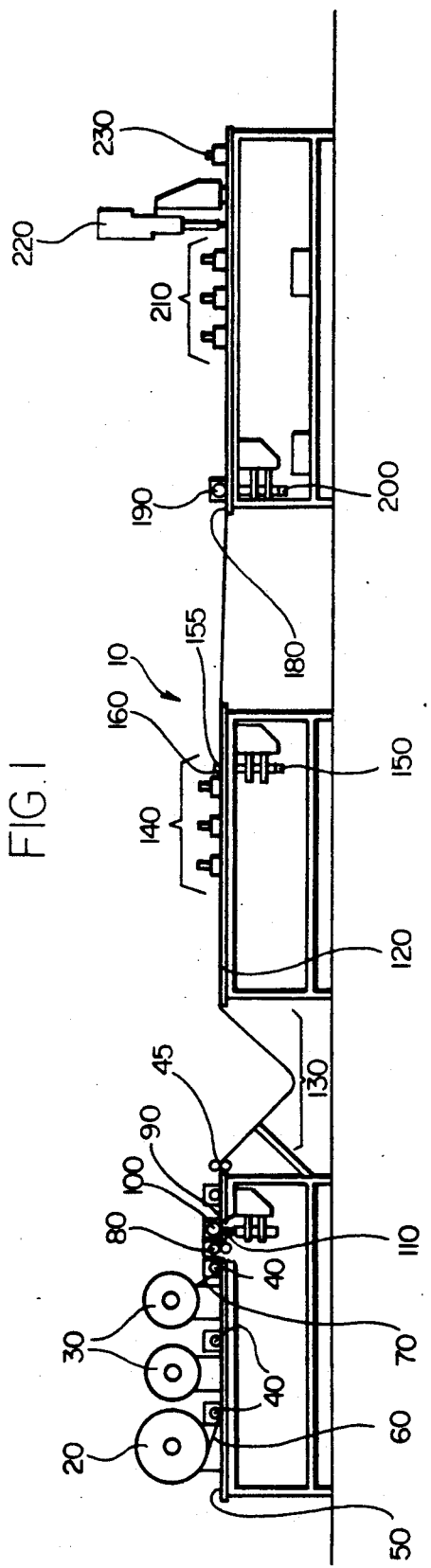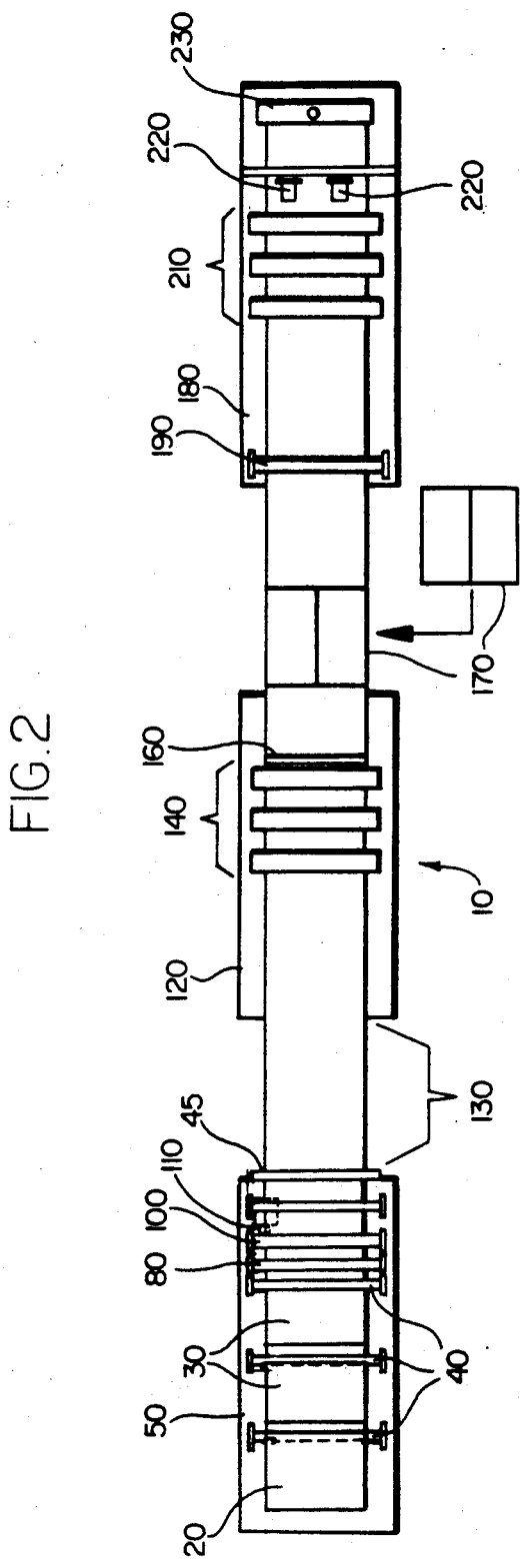

CONTINUOUS PROCESS FOR PRODUCING ULTRASONICALLY WELDED AIR FILTERS

The present invention relates to the field of air filters for use in residential and industrial heating, cooling and ventilation systems. More particularly, the invention relates to a method for producing such air filters using ultrasonic welding as part of a continuous process.

BACKGROUND OF THE INVENTION

Air filters are commonly employed in forced air or blower ventilation systems, including heating and cooling systems. Such systems are used for a variety of purposes, such as home heating and cooling, air circulation and cleaning in closed commercial and office environments, and commercial and industrial heating and cooling applications.

In a typical forced air or blower system, air is taken in through one or more intake vents or ducts, which may be located inside the building for recirculation, or which may intake fresh air from outside the building. Air taken in through these ducts will often contain coarse particulate matter, such as sand, dirt and hair, and also typically includes fine particulate matter such as dust, smoke, germs and similar minute particles. Before the air enters the blower, it is desirable to remove both coarse and fine particles from the air, to prevent the buildup of such unwanted materials in the blower. Removal of particles increases blower life, and reduces maintenance and cleaning costs relating to heating, cooling and ventilation. Particulate removal also enhances air quality, since the undesirable particles are removed from the air stream. In recirculation systems, with little fresh air introduced relative to the total air volume moved through the system, particulate removal is critical to reduce the spread of germs and allergens through the building.

In order to remove particles, residential and commercial forced air and blower systems have previously employed fiberglass filters in intake ducts. These filters are typically comprised of amorphous networks of fiberglass set in or around metal, plastic or paperboard frames. A single density of fiberglass is typically employed to remove both coarse and particulate fibers.

A number of problems, however, are inherent in such fiberglass filters. Single density filters usually have a short lifespan, since a fine network of fibers must be used to trap both fine and coarse particles; coarse particles tend to block the flow of air through the filter as they build up on the filter surface. Another defect found in fiberglass filters relates to recent studies that have determined that fiberglass is a Class B carcinogen. As a result of these deficiencies, other filtering means are needed for use in forced air and blower systems.

Synthetic fibers, such as polyester and polybutylene, have also been employed to create amorphous networks for use in filters for forced air and blower systems. Typically, such filters are made by welding or sealing two sheets of amorphously networked synthetic fibers together around a frame. Welding occurs through the induction of electrical current resulting from a radio frequency (RF) generator associated with a die in a stamping process. In the conventional process, a die is cast in the pattern of the filter to be made. A high amplitude pulse of electromagnetic energy, in the form of a radio wave, is applied to the die, which heats the fibers in the two sheets, causing them to melt and thereby bond to one another. After welding has occurred, the die is removed.

The production of filters using such a process is typically a die-stamping operation, which is relatively slow and results in low production volumes and increased production costs. Die stamping also means that any change in the design of the filter being produced requires the casting and installation of a new die, resulting in lost production due to down time. In addition, variations in the thickness and density of the fiber sheets can results in sections of filter that are melted or burned, rendering the filter unusable. The result of these problems has been as effective limit on the ability to manufacture synthetic air filters in an efficient and cost-effective manner.

The use of ultrasonic welding techniques is well-known in the manufacture of products other than air filters use in HVAC systems. For example, U.S. Pat. No. 4,686,136, describes laminated fabrics and fiber mats produced by welding one or more woven fabrics to a non-woven batt made from carbon fibers and thermoplastic materials. Ultrasonic energy is applied through a sonic horn vibrating against an anvil roller on which numerous pins are disposed. According to the patent, the pins function to concentrate the sonic energy, forming structural columns of material at the points of concentration, and permitting fiber batt to remain uncompressed in areas where energy is not concentrated by an anvil roller pin. Such a technique would not be suitable for air filters, however, since such filters are comprised of at least two non-woven fiber mats, which must be bonded continuously at all margins.

A similar arrangement is shown in U.S. Pat. No. 4,659,614. In that patent, raised surfaces on the anvil roller are used to concentrate ultrasonic energy to produce a quilted fabric made from either a single web of non-woven, thermoplastic fibers, or from a densely packed web of such fibers bonded to a loosely packed web of fibers.

Other examples of thermoplastic welding are illustrated in U.S. Pat. Nos. 4,883,547, 4,713,131, 4,501,782, 3,982,978, 3,817,802, and 3,193,169. The techniques disclosed in those patents are not suitable for the commercial production of air filters, which requires a continuous process to produce a narrow, welded seam regardless of material thickness or density.

None of the methods described in the patents just cited provides an adequate method of producing an air filter of the type described above. The bonding of various thicknesses of an amorphous web of synthetic fibers, to encompass a frame, is neither shown nor suggested by those patents. The techniques described in those patents are therefore unsuitable for use in the manufacture of air filters for HVAC systems.

SUMMARY OF THE INVENTION

The present invention provides a superior method of producing air filters as compared to the earlier methods just described. According to the present invention, a method for the continuous production of air filters using ultrasonic welding techniques is provided in several steps. First, a first sheet of amorphous thermoplastic filter material and a second sheet of amorphous thermoplastic filter material are provided in layered arrangement for welding; these sheets are essentially continuous in length. These sheets of filter material through are then advanced through a first continuous welding means to produce a first weld along one edge of the length of the filter material. The first continuous welding means includes a sonic horn and an anvil roller. The first and second sheets of filter material are then ultrasonically welded across the width of the filter material at discrete intervals corresponding to a predetermined filter length, so that a pocket is formed in the filter material by the welds so produced. A frame is inserted into the pocket formed in the filter material, and a fourth weld is formed along the length of the filter material opposite the first weld by continuously advancing the filter material through a second continuous welding means. Finally, the filter material is cut into filters of predetermined length by cutting the filter material between the trailing weld of one filter and the leading weld of the next filter.

It is thus an object of the present invention to produce an air filter for use in forced air or blower heating, cooling and ventilation systems, made from synthetic fibers by a continuous process.

Another object of the present invention is to provide such a process that enables filters to be made from sheets of different density in order to screen both coarse and particulate matter using a single filter.

Still another object of the present invention is to provide an efficient and cost effective method for producing such filters, regardless of filter size, using ultrasonic welding techniques.

The manner of carrying out these and other objects of the invention shall become apparent from the detailed description of the invention set forth below.

BRIEF DESCRIPTION OF THE DRAWINGS

FIG. 1 is a plan view of an embodiment of the method of the present invention, illustrating one line configuration for commercial of air filters using ultrasonic welding.

FIG. 2 is top view of the embodiment of FIG. 1.

DETAILED DESCRIPTION OF THE INVENTION

Figure 3:
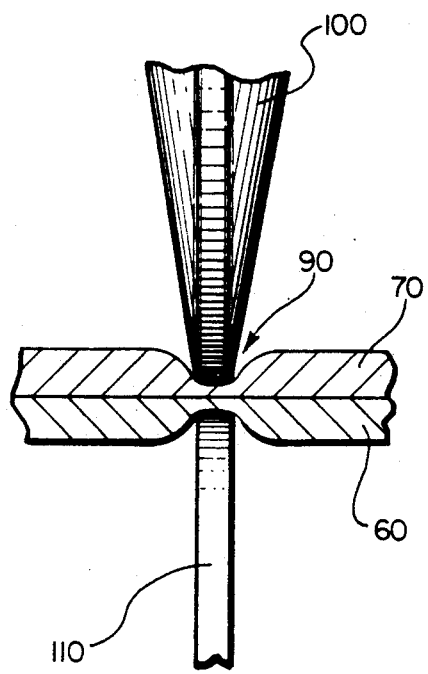
FIG. 3 is a front view of a continuous ultrasonic welding means as employed in the present invention.

The present invention is directed primarily to the production of air filters in which two sheets of filter material (a non-woven, amorphous thermoplastic fiber web) are welded together. It will be understood, however, that more than two sheets of such materials may be welded together according to the method of the present invention without departing from the teaching of the invention.

The sheets of filter material may be of the same thickness and density. It is desirable, however, to make air filters from sheets of filter material that are of different density and thickness, so that the lower density sheet may be employed to trap large particles of unwanted material, and the higher density material may be employed to trap fine particulate. The filter material is preferably a thermoplastic material, such as polyester or polybutylene, or other similar materials.

Referring to FIG. 1, reels 20 and 30 of filter material are disposed at one end of a production line 10. The material on each reel is of sufficient length to produce a large number of filters without the need to replenish the reel with additional material; additional reels are preferably provided in close proximity to the reels 20 and 30 to permit immediate replenishment upon the consumption of a reel of material. Because the length of material is quite large, and can be easily and quickly replenished without substantial interruption of the production process, the length of filter material may be characterized as essentially continuous.

The sheets of filter material are selected to be of a width slightly larger than the width of the filter to be produced. Idlers 40 are disposed near the reels 20 and 30 to layer the first and second sheets of filter material and to bring them into contact with a first work surface 50. Drive rollers 45 are positioned at one end of the first work surface 50 to pull filter material from the reels and along the work surface 50.

With the first sheet 60 and the second sheet 70 of filter material in contact with each other, pinch rollers 80 are provided to pinch the two sheets together and compress them for welding. Immediately thereafter, the sheets 60 and 70 are compressed in a welding nip 90, shown best in FIGS. 3 and 4, to produce a first edge weld 95.

Figure 4:
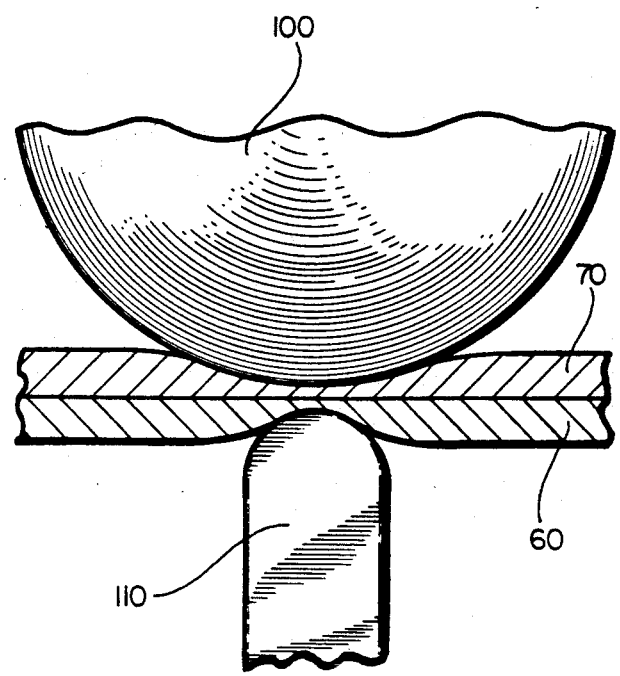
FIG. 4 is a side view of the welding means shown in FIG. 3.

As illustrated in FIG. 3, a nip 90 is formed between an anvil roller 100 and a sonic horn 110 from which ultrasonic vibrations are emitted. The ultrasonic vibrations are collected by the anvil roller 100, which is made from a dense material (such as stainless steel) to conduct the vibrations from the sonic horn 110. The anvil roller 100 is narrow and smooth along its circumference to produce a weld that is narrow and continuous. This has the advantages of maximizing the surface of filter through which air can pass and providing a secure weld to hold the filter elements together.

Figure 5:
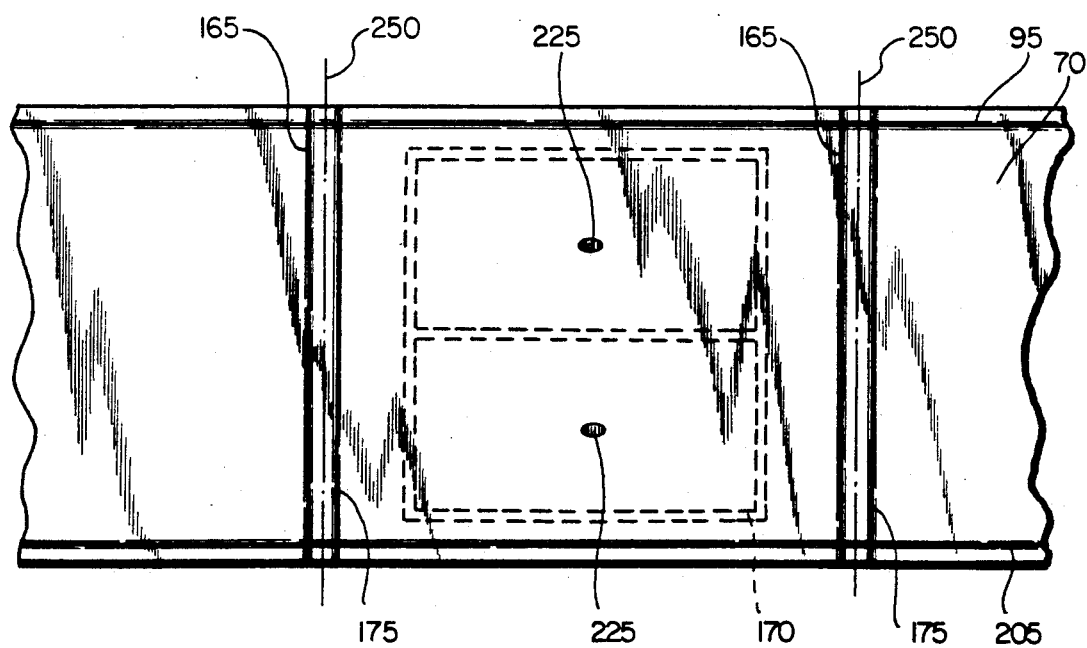
FIG. 5 is a top view of the filter material used to make the filters according to the method of the present invention, with a frame inserted and showing the welds created by the method of the present invention.

As the compressed first and second sheets of filter material 60 and 70 are passed through the nip 90, the ultrasonic vibrations collected by the anvil roller 100 melt the filter material to produce the first edge weld 95 that binds the two sheets of material together along the welded seam. The location of the first edge weld 95 is shown in FIG. 5.

The sonic horn 110 is a conventional aluminum or titanium horn such as that manufactured by Branson Ultrasonic. The sonic horn 110 also includes a flat tip (shown best in FIG. 4) to produce a narrow weld along one edge of the sheets of filter material without tearing the filter material as it passes through the nip 90.

Because the two sheets of filter material are compressed by the pinch rollers 80 prior to welding, and because they are compressed between the anvil roller 100 and the sonic horn 110 to form the weld, the thickness of each sheet has no effect on the welding process. This provides an advantage over presently known systems, which require significant adjustment in power output and die configuration to accommodate materials of different thickness.

Turning back to FIG. 1, with a first weld formed along one edge of the filter material, the filter material moves from a first work surface 50 to a second work surface 120. One or more scanning devices 140 are provided in a filter material advance system for determining the length of material that has been passed along the second work surface 120. Such scanning devices 140 may comprise, for example, optical or electromagnetic position sensors, or other similar transducers. These scanning devices 140 operate to pull a predetermined length of material along the work surface 120, corresponding to the length of each filter that is being produced.

Filter material from first work surface 50 is continuously welded and ejected from the work surface 50. By contrast, and for reasons that shall become clear, material on the second work surface 120 is transported in discrete bursts or pulses. An accumulator chute 130 is provided in line 10 to take up slack in the filter material 10 between the first and second work surfaces 50 and 120.

A second welding station, the components of which are denoted by reference numerals 150 and 160, is provided on the work surface 120 to produce welds across the width of the sheets of fiber material. This welding station comprises a conventional sonic horn 150 and anvil 160, which take the form of thin bars oriented across the width of the filter material. The sonic horn 150, which is positioned below the filter material and the work surface, and the anvil 160 (positioned above the filter material and work surface) are brought together at intervals defined by the length of the filter being produced, compressing the filter material between them in a gap 155 and welding them as described above. A leading weld 165 is produced across the width of the filter material to define one end of an individual filter, while a trailing weld 175 is produced to define the other end of the filter. These leading and trailing welds across the width of the filter material are repeated for each filter to be produced, as shown in FIG. 5.

After leading and trailing welds are produced, a pocket is formed in the filter material, defined by the two width welds and the first edge weld produced on the first work surface. As shown in FIG. 2, a frame 170 is placed into the pocket just described to provide support for the filter in use. The frame 170 is made of metal, or if suitable, thermoplastic material such as polypropylene or polyvinyl chloride. Frames are inserted into the pockets manually, or by automatic means.

Finally, the filter material (including frames) is transported to a third work surface 180. At one end of the third work surface there is provided a scan welding anvil roller 190 and sonic horn 200, which are essentially identical to the anvil roller 100 and the horn 110 on first work surface 50 in function and design. The anvil roller 190 and the horn 200 are situated to weld closed the open end of each pocket formed in the filter material. In other words, the anvil roller 190 and the horn 200 are placed along the unwelded edge of the fiber material, to produce a weld 205 as shown in FIG. 5.

In the preferred embodiment, a second filter material advance means 210, corresponding to the scanning devices 140 on second work surface 120, is provided on the third work surface 180 to advance the filter an appropriate amount along the line to permit the frame to be welded securely in place. The filter advance means 210 pushes the filter material and frames under one or more ultrasonic spot welders 220, so that spot welds are produced in the center of each frame segments. These spot welds 225 are shown in FIG. 5.

The welded filter material, including the frames, is then transported past a shearing means 230, which cuts the filters across the width of the filter material to produce a filter of the desired length. Shearing means 230 may include its own position sensing device for determining when a cut is to be made, or it may be operated by the filter advancing means 140 described above. In each instance, the cut 250 is made between the trailing weld of one filter and the leading weld of the next filter in the essentially continuous band of filter material, as shown in FIG. 5.

Figure 6:
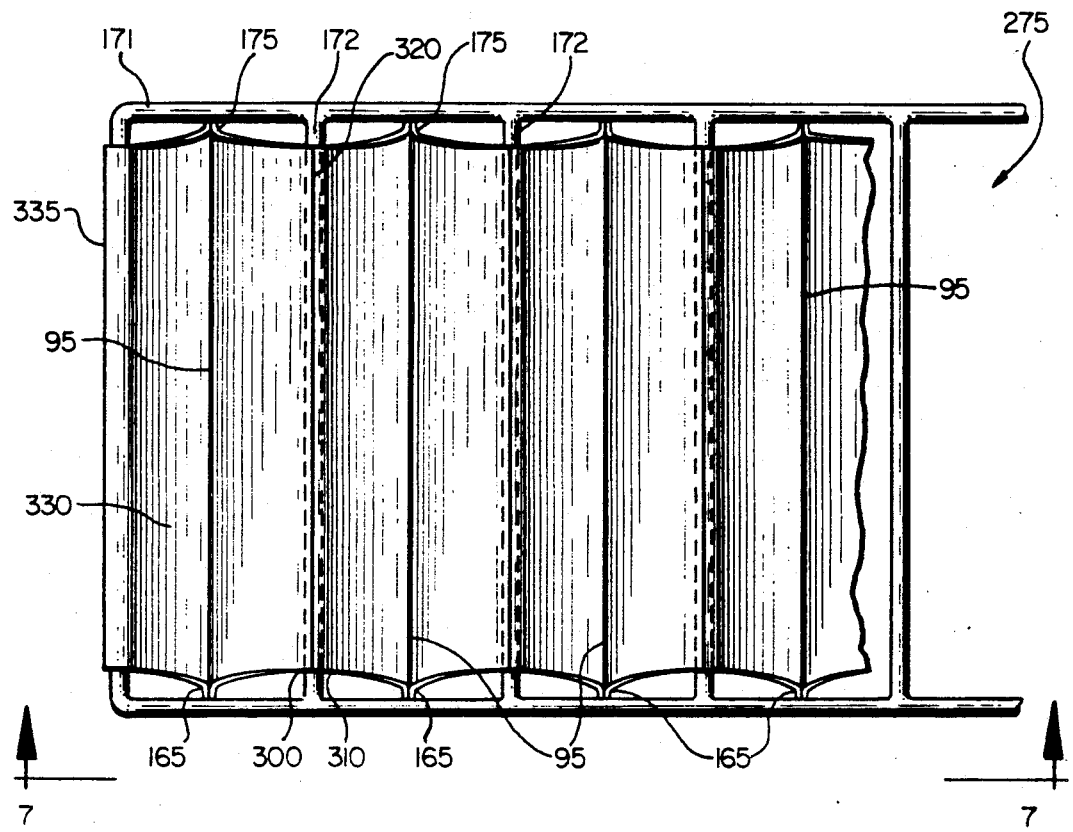
FIG. 6 is a top view of a bag filter made according to the present invention.
Figure 7:
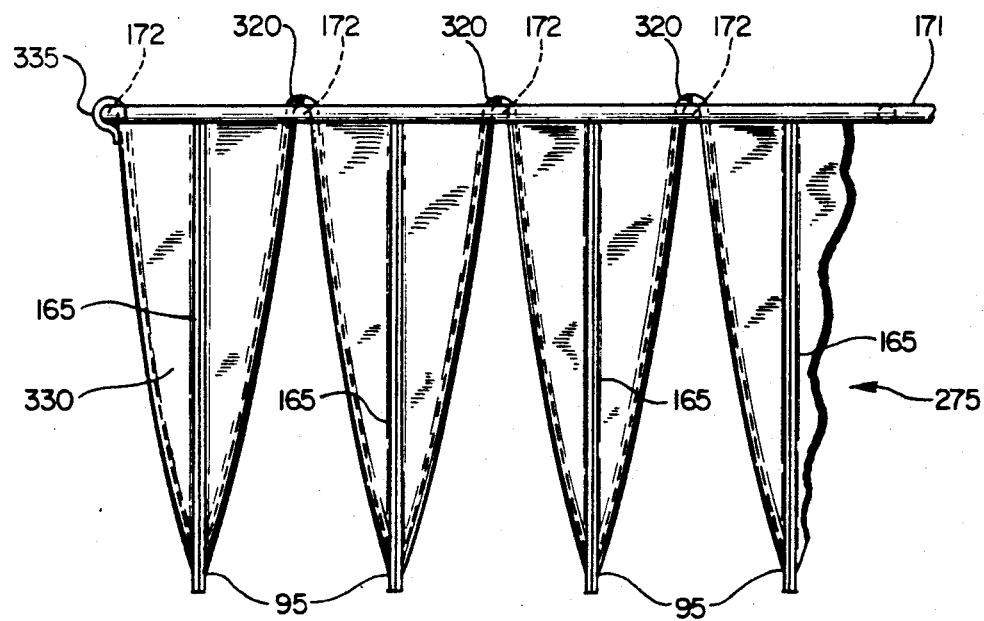
FIG. 7 is side view of the bag filter.

Another variation of the filter that can be produced using the method of the present invention takes the form of a bag filter 275 made from the same synthetic fiber material. The bag filter 275 is shown in FIGS. 6 and 7, and comprises a series of the pockets described above, welded together so that they are supported on a frame. Bag filters of this type are, like other filters, conventionally produced from fiberglass cloth, and therefore have the same undesirable characteristics as ascribed to fiberglass rings filters.

In producing the bag filter 275, the first edge weld and the leading and trailing welds are produced as described above, to form a series of three sided pockets in the filter material. These pockets are then cut apart using the shearing device described above, and arranged side by side as shown in FIGS. 6 and 7. The upper edge 300 of one side of a first pocket is then joined to the upper edge 310 of each adjacent pocket using conventional ultrasonic welding techniques, forming a seam weld 320. This process is repeated until the number of pockets joined together is sufficient to produce a bag filter 275 of the appropriate size. The connected pockets are then inserted over a frame 171, so that the seam welds 320 upon the cross members 172 of frame 171 (shown in phantom in FIG. 6). The outside edge 335 of the terminal pockets 330 are heat sealed around the frame 171 to that the pockets and frame form a unitary assembly.

The materials and ultrasonic devices used to make the bag filters 275 are the same as those that may be employed in making the ring described above.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A method for the continuous production of air filters using ultrasonic welding techniques, comprising the steps of:

providing a first sheet of synthetic amorphous filter material and a second sheet of synthetic amorphous filter material in layered arrangement for welding, the sheets of filter material being essentially continuous;

continuously advancing both sheets of filter material through a first continuous welding means to produce a first weld along one edge of the length of the filter material, the first continuous welding means including a sonic horn and an anvil roller;

ultrasonically welding the first and second sheets of filter material across the width of the filter material at discrete intervals corresponding to a predetermined filter length, thus forming a leading weld and a trailing weld, so that a pocket is formed in the filter material by the welds so produced;

inserting a frame into the pocket in the filter material;

forming a fourth weld along the edge of the filter material opposite the first weld by continuously advancing the filter material through a second continuous welding means, the second continuous welding means including a sonic horn and an anvil roller; and, cutting the welded filter material into filters of predetermined length by cutting the filter material between the trailing weld of one filter and the leading weld of the next filter.

2. The method of claim 1, further comprising the step of spot welding the frame in place by forming at least one spot weld in the filter material after the frame is inserted into the pocket.

3. The method of claim 1, in which the first sheet of filter material is of a density greater than the second sheet of filter material.

4. The method of claim 1, wherein more than two sheets of filter material are employed to make the air filter.

5. The method of claim 1, wherein the frame is made of a metal.

6. The method of claim 1, wherein the synthetic filter material is selected from the group consisting of polybutylene and polyester.

7. The method of claim 1, wherein the first and second sheets of synthetic fiber materials are made of different materials.

8. The method of claim 1, wherein the anvil rollers are narrow and smooth along their circumferences to produce a narrow and continuous weld.

9. A method for the continuous production of air filters using ultrasonic welding techniques, comprising the steps of:

providing a first sheet of synthetic amorphous filter material and a second sheet of synthetic amorphous filter material in layered arrangement for welding, the sheets of filter material being essentially continuous, the first and second sheets of material being of different density;

continuously advancing both sheets of filter material through a first continuous welding means to produce a first weld along one edge of the length of the filter material, the first continuous welding means including a sonic horn and an anvil roller;

ultrasonically welding the first and second sheets of filter material across the width of the filter material at discrete intervals corresponding to a predetermined filter length, so as to form a leading weld and a trailing weld, so that a pocket is formed in the filter material by the welds so produced;

inserting a frame into the pocket in the filter material;

forming a fourth weld along the edge of the filter material opposite the first weld by continuously advancing the filter material through a second continuous welding means, the second continuous welding means including a sonic horn and an anvil roller;

spot welding the frame in place by forming at least one spot weld in the filter material after the frame is inserted into the pocket;

cutting the filter material into filters of predetermined length by cutting the filter material between the trailing weld of one filter and the leading weld of the next filter.

10. The method of claim 9, wherein the frame is made of a metal.

11. The method of claim 9, wherein the synthetic filter material is selected from the group consisting of polybutylene and polyester.

12. The method of claim 9, wherein the first and second sheets of synthetic fiber materials are made of different materials.

13. The method of claim 9, wherein the anvil rollers are narrow and smooth along their circumferences to produce a narrow and continuous weld.

14. A method for the continuous production of air filters using ultrasonic welding techniques, comprising the steps of:

providing a first sheet of synthetic amorphous filter material and a second sheet of synthetic amorphous filter material in layered arrangement for welding, the sheets of filter material being essentially continuous;

continuously advancing both sheets of filter material through a first continuous welding means to produce a first weld along one edge of the length of the filter material, the first continuous welding means including a sonic horn and an anvil roller;

ultrasonically welding the first and second sheets of filter material across the width of the filter material at discrete intervals corresponding to a predetermined filter length, forming a leading weld and a trailing weld, so that a pocket is formed in the filter material by the welds so produced;

cutting the pockets from the essentially continuous web of filter material to produce individual pockets each of which includes an open upper end;

ultrasonically welding one side of the upper end of open pocket to an open side of the upper end of an adjacent pocket to form a series of connected pockets having seam welds at the point where each pocket is connected to an adjacent pocket, the series having two terminal upper ends not welded to any other pocket;

inserting the series of pockets into a frame having cross members, such that the seam welds are supported by the cross member; and, sealing the terminals ends of the series of pockets to the frame.

15. The method of claim 14, wherein the frame is made of a metal.

16. The method of claim 14, wherein the synthetic filter material is selected from the group consisting of polybutylene and polyester.

17. The method of claim 14, wherein the anvil rollers are narrow and smooth along their circumferences to produce a narrow and continuous weld.

18. An air filter made by the process of claim 1.

19. An air filter made by the process of claim 9.

20. A bag filter made by the process of claim 14.

* * * * *

UNITED STATES PATENT OFFICE
CERTIFICATE OF CORRECTION

Patent No. 5,215,609          Dated June 1, 1993

Inventor(s) Scott L. SANDERS

It is certified that error appears in the above-identified patent and that said Letters Patent is hereby corrected as shown below:

Col. 2, line 11, delete "results" and insert —result— therefor.

Col. 2, line 27, insert —the— after "permitting" and before "fiber".

Col. 6, line 36, insert —filters— after "ring" and before "described".

Signed and Sealed this

Twenty-first Day of December, 1993

Attest:

BRUCE LEHMAN

Attesting Officer           Commissioner of Patents and Trademarks